(12) United States Patent
Khan et al.

(10) Patent No.: US 9,864,984 B2
(45) Date of Patent: Jan. 9, 2018

(54) APPARATUSES AND METHODS FOR OPERATING A PORTABLE ELECTRONIC DEVICE TO CONDUCT MOBILE PAYMENT TRANSACTIONS

(71) Applicant: Apple Inc., Cupertino, CA (US)

(72) Inventors: Ahmer A. Khan, Milpitas, CA (US); Gregory B. Novick, San Francisco, CA (US); Jerrold V. Hauck, Windermere, FL (US); Saket R. Vora, San Francisco, CA (US); Yehonatan Perez, Menlo Park, CA (US)

(73) Assignee: Apple Inc., Cupertino ( * ) Notice: Subject to any disclaimer, the term of this patent is extended or adjusted under 35 U.S.C. 154(b) by 0 days.

(21) Appl. No.: 15/080,130

(22) Filed: Mar. 24, 2016

(65) Prior Publication Data

US 2016/0203467 A1    Jul. 14, 2016

Related U.S. Application Data

(63) Continuation of application No. 14/475,263, filed on Sep. 2, 2014, now Pat. No. 9,299,072.

(Continued)

(51) Int. Cl.
*G06K 5/00* (2006.01)
*G06Q 20/32* (2012.01)
(Continued)

(52) U.S. Cl.
CPC ......... *G06Q 20/3227* (2013.01); *G06Q 20/32* (2013.01); *G06Q 20/3278* (2013.01);
(Continued)

(58) Field of Classification Search
CPC .... G06Q 20/20; G06Q 20/3278; G06Q 30/06; G06Q 20/204; G06Q 20/3223
(Continued)

(56) References Cited

U.S. PATENT DOCUMENTS 6,282,612 B1    8/2001  Sakajiri et al.
6,703,918 B1    3/2004  Kita
(Continued)

FOREIGN PATENT DOCUMENTS

EP    2388744    11/2011
GB    2277183    10/1994
(Continued)

OTHER PUBLICATIONS

Maragoudakis, U.S. Appl. No. 14/775,349, filed Sep. 11, 2015.
(Continued)

*Primary Examiner* — Seung Lee
(74) *Attorney, Agent, or Firm* — Treyz Law Group, P.C.; Jason Tsai

(57) ABSTRACT

Methods for operating a portable electronic device to conduct a mobile payment transaction at a merchant terminal are provided. The electronic device may verify that the current user of the device is indeed the authorized owner by requiring the current user to enter a passcode. If the user is able to provide the correct passcode, the device is only partly ready to conduct a mobile payment. In order for the user to fully activate the payment function, the user may have to supply a predetermined payment activation input such as a double button press that notifies the device that the user intends to perform a financial transaction in the immediate future. The device may subsequently activate a payment applet for a predetermined period of time during which the user may hold the device within a field of the merchant terminal to complete a near field communications based mobile payment transaction.

25 Claims, 9 Drawing Sheets

Related U.S. Application Data

(60) Provisional application No. 62/004,840, filed on May 29, 2014.

(51) Int. Cl.
    *G06Q 20/38*     (2012.01)
    *G06Q 20/34*     (2012.01)
    *G06Q 20/40*     (2012.01)
    *G06Q 20/36*     (2012.01)

(52) U.S. Cl.
CPC ......... *G06Q 20/352* (2013.01); *G06Q 20/353* (2013.01); *G06Q 20/367* (2013.01); *G06Q 20/382* (2013.01); *G06Q 20/4018* (2013.01); *G06Q 20/4097* (2013.01); *G06Q 20/40975* (2013.01)

(58) Field of Classification Search
USPC .................................................. 235/380, 492
See application file for complete search history.

(56) References Cited

U.S. PATENT DOCUMENTS

| | | | |
|---|---|---|---|
| 6,974,078 B1 | 12/2005 | Simon | |
| 7,641,111 B2 * | 1/2010 | Adams | G06Q 20/105 235/380 |
| 7,900,833 B2 | 3/2011 | Silverbrook et al. | |
| 8,065,235 B2 | 11/2011 | Narayanaswami et al. | |
| 8,113,438 B1 | 2/2012 | Leason et al. | |
| 8,126,806 B1 | 2/2012 | DiMartino et al. | |
| 8,196,131 B1 | 6/2012 | Behren et al. | |
| 8,223,024 B1 | 7/2012 | Petrou | |
| 8,335,932 B2 | 12/2012 | Behren et al. | |
| 8,346,672 B1 | 1/2013 | Weiner et al. | |
| 8,380,177 B2 * | 2/2013 | Laracey | G06Q 30/0253 370/259 |
| 8,649,770 B1 | 2/2014 | Cope et al. | |
| 8,666,895 B2 | 3/2014 | Grigg et al. | |
| 9,299,072 B2 * | 3/2016 | Khan | G06Q 20/382 |
| 9,529,490 B2 * | 12/2016 | Li | G06F 3/0481 |
| 2003/0001722 A1 | 1/2003 | Smith et al. | |
| 2004/0225613 A1 | 11/2004 | Narayanaswami et al. | |
| 2006/0288233 A1 | 12/2006 | Kozlay | |
| 2007/0050618 A1 | 3/2007 | Roux et al. | |
| 2007/0162350 A1 | 7/2007 | Friedman | |
| 2008/0045806 A1 | 2/2008 | Keppler | |
| 2009/0159678 A1 | 6/2009 | Day et al. | |
| 2009/0212902 A1 | 8/2009 | Haddock | |
| 2010/0023449 A1 | 1/2010 | Skowronek et al. | |
| 2011/0165896 A1 | 7/2011 | Stromberg et al. | |
| 2011/0214158 A1 | 9/2011 | Pasquero et al. | |
| 2011/0239304 A1 | 9/2011 | Saarisalo | |
| 2012/0011572 A1 | 1/2012 | Chew et al. | |
| 2012/0024947 A1 | 2/2012 | Naelon | |
| 2012/0030043 A1 | 2/2012 | Ross et al. | |
| 2012/0143706 A1 * | 6/2012 | Crake | G06Q 20/20 705/18 |
| 2012/0221421 A1 | 8/2012 | Hammad | |
| 2012/0241524 A1 | 9/2012 | Blot et al. | |
| 2012/0244805 A1 | 9/2012 | Haikonen et al. | |
| 2013/0060618 A1 | 3/2013 | Barton et al. | |
| 2013/0069985 A1 | 3/2013 | Wong et al. | |
| 2013/0073448 A1 | 3/2013 | Wall et al. | |
| 2013/0111599 A1 | 5/2013 | Gargiulo | |
| 2013/0151400 A1 | 6/2013 | Makhotin et al. | |
| 2013/0173477 A1 | 7/2013 | Cairns | |
| 2013/0332353 A1 | 12/2013 | Aidasani et al. | |
| 2014/0058937 A1 | 2/2014 | Watson | |
| 2014/0108260 A1 | 4/2014 | Poole et al. | |
| 2014/0129438 A1 | 5/2014 | Desai et al. | |
| 2014/0244495 A1 | 8/2014 | Weiner et al. | |
| 2014/0325614 A1 | 10/2014 | Rhelimi | |
| 2015/0058191 A1 | 2/2015 | Khan et al. | |
| 2015/0348009 A1 | 12/2015 | Brown et al. | |
| 2015/0348025 A1 | 12/2015 | Brown et al. | |
| 2015/0356602 A1 * | 12/2015 | Moore | G06Q 30/0257 705/14.55 |

FOREIGN PATENT DOCUMENTS

| | | |
|---|---|---|
| GB | 2407189 | 4/2005 |
| KR | 10-2007-0048860 | 5/2007 |
| KR | 10-2014-0063816 | 5/2014 |
| WO | 2008147457 | 12/2008 |
| WO | 2009039419 | 3/2009 |
| WO | 2010111002 | 9/2010 |
| WO | 2014122451 | 8/2014 |
| WO | 2014143916 | 9/2014 |

OTHER PUBLICATIONS

International Search Report and Written Opinion dated Jun. 30, 2015 in PCT/US2015/024447, 9 pages.

Maragoudakis, International Patent Application No. PCT/US2013/032529 filed on Mar. 15, 2013.

Video: Forget smartphones and NFC, 'Coin' is the future of payments. Zach Epstein, Nov. 14, 2013 [retrieved on Oct. 2, 2014]. Retrieved from the Internet: <http://news.yahoo.com/video-forget-smartphones-nfc-coin-futurepayments-i 70024328.html>.

Bell ID Secure Element in the Cloud. Bell ID [retrieved on Oct. 3, 2014]. Retrieved from the Internet: <http://bellid.com/products/secure-element-in-the-cloud/>.

Haggerty et al., U.S. Appl. No. 61/909,717, filed Nov. 27, 2013.

Brown et al., U.S. Appl. No. 62/004,338, filed May 29, 2014.

International Search Report and Written Opinion dated Apr. 6, 2015 in PCT Application No. PCT/US14/28095, 14 pages.

International Search Report and Written Opinion dated Sep. 6, 2014 in POT Application No. PCT/US13/32529, 19 pages.

European Search Report dated Mar. 8, 2016, for application No. 14765497.4, 8 pages.

* cited by examiner

APPARATUSES AND METHODS FOR OPERATING A PORTABLE ELECTRONIC DEVICE TO CONDUCT MOBILE PAYMENT TRANSACTIONS

CROSS-REFERENCE TO RELATED APPLICATION(S)

This application is related to U.S. Patent Publication No. 2015/0127550, entitled "Using Bioauthentication in Near-Field-Communication Transactions," by Inventor Ahmer A. Khan, published on May 7, 2015, to U.S. Patent Publication No. 2015/0348008, entitled "Methods for Managing Payment Applets on a Secure Element to Conduct Mobile Payment Transactions," by Inventor Ahmer A. Khan, published on Dec. 3, 2015, to U.S. Patent Publication No. 2015/0348022, entitled "Apparatuses and Methods for Using a Random Authorization Number to Provide Enhanced Security for a Secure Element," by Inventors Ahmer A. Khan et al., also published on Dec. 3, 2015, and to U.S. Patent Publication No. 2015/0348009, entitled "User Device Enabling Access to Payment Information in Rresponse to Mechanical Input Detection," by Inventors Jeremy T. Brown et al., also published on Dec. 3, 2015, which are hereby incorporated by reference in their entireties.

This application is a continuation of U.S. patent application Ser. No. 14/475,263, filed Sep. 2, 2014 and provisional patent application No. 62/004,840, filed May 29, 2014. This application claims the benefit of and claims priority to U.S. patent application Ser. No. 14/475,263, filed Sep. 2, 2014, and provisional patent application No. 62/004,840, filed May 29, 2014, which are hereby incorporated by reference herein in their entireties.

BACKGROUND

This relates generally to electronic devices, and more particularly, to operating electronic devices to conduct mobile payment transactions.

Portable electronic devices such as cellular telephones are sometimes provided with near field communications (NFC) circuitry that allows the electronic devices to perform contactless proximity-based communications with a corresponding NFC reader. Oftentimes, the NFC circuitry in a user device is used to carry out financial transactions or other secure data transactions that require the user device to verify and access a commerce credential such as a credit card credential. The secure data that is necessary for performing such mobile financial transactions is typically stored on a secure element within an electronic device.

Consider a scenario in which the secure element stores secure data corresponding to a given credit card credential. The secure element should only output the secure data during an authorized mobile payment transaction (i.e., an unauthorized user should not be able to access the payment function on the device). It may therefore be desirable to provide a way for an authorized user to provide some input that results in temporary activation of the payment function on the user device.

SUMMARY

Apparatuses and methods for operating a portable electronic device to conduct mobile payment transactions are provided.

In accordance with an embodiment, the electronic device may include a secure element and a processor that communicates with the secure element. The electronic device may be configured to receive a payment initiation input from a user. In response to receiving the payment initiation input, the secure element may be used to send a notification to the processor indicating that the payment initiation input has been received from the user. Thereafter, the secure element may be used to communicate with the processor to temporarily activate the secure element for payment.

In accordance with another embodiment, the portable electronic device may include a secure element for securely storing commerce credentials, an applications processor that is configured to communicate with the secure element via a secure channel, and input-output devices for interfacing with a user of the device. The secure element may have an associated secure element identifier (SEID).

The user may be required to enable a passcode lock function on the device prior to performing a financial transaction with the device. When the passcode lock function is enabled, the device may be placed in a locked state when the device is idle and may be placed in an unlocked state when the user is able to provide a correct passcode. In response to receiving the correct passcode from the user, the applications processor may retrieve a random authorization number "AuthRand" from a user keychain that is maintained on the applications processor (e.g., a keychain on which sensitive user information is securely stored).

The input-output devices may be used to receive some predetermined input sequence from the authorized user for initiating a mobile payment transaction. For example, the user may double press on a button to signal to the device the intent to conduct an NFC-based financial transaction using the device at a merchant terminal. In accordance with an embodiment, the secure element may be provided with a contactless registry service (CRS) applet that asserts a "user input received" flag in response to detecting the predetermined user input sequence.

The electronic device may also include a power management unit (PMU) that is used to detect the predetermined input sequence from the user. The PMU may be a non-reconfigurable digital state machine (as an example). The PMU may receive a trigger signal from the input-output devices upon receiving the predetermined input sequence from the user. This trigger signal may direct the PMU to send an alert to both the applications processor and the secure element (e.g., to send asserted enable signals to the applications processor and the secure element).

The secure element may be used to confirm that the received user input is a valid predetermined user input sequence (e.g., by monitoring the state of an authorization signal that is output by the power management unit). The power management unit may assert the authorization signal for a predetermined period of time in response to detecting a valid user payment initiation input sequence. Once the user input has been validated, a contactless registry service (CRS) applet on the secure element may assert a "user input received" control flag, and the secure element may be configured to send a notification to the applications processor indicating that a valid user input sequence (sometimes referred to herein as a payment initiation input) has been received.

In response to receiving the notification from the secure element, the applications processor may be used to derive an authentication key "AuthKey" based on the SEID of the secure element and/or on a unique identifier of the applications processor. Thereafter, the secure element may send a card cryptogram to the applications processor. The applications processor may decode the card cryptogram using the derived AuthKey and may be used to determine whether to proceed with activating a payment applet on the secure element by comparing a least a portion of the card cryptogram to the retrieved AuthRand. If the portion of the card cryptogram matches the retrieved AuthRand, the applications processor may proceed to send a host cryptogram to the secure element. The host cryptogram may be encrypted using the AuthKey using a cipher-based message authentication code (CMAC) algorithm, as an example.

The secure element may receive the host cryptogram from the applications processor and may be used to determine whether to proceed with activating the payment applet by analyzing at least a portion of the received host cryptogram. If the portion of the host cryptogram satisfies design criteria, the CRS applet may be used to temporarily activate the payment applet. At this point, the user may bring the electronic device within the field of a merchant terminal to complete a mobile payment transaction.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Figure 1:
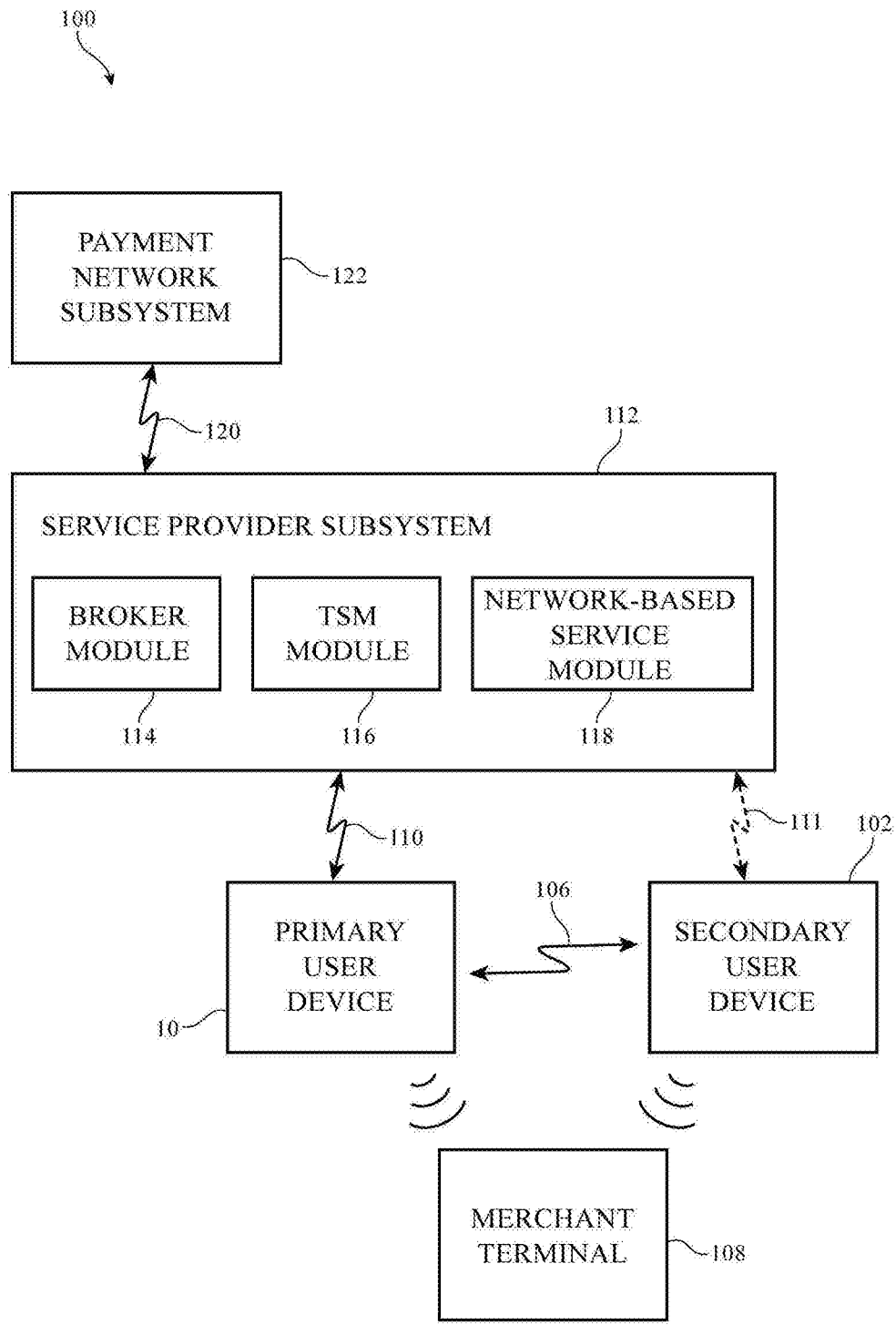
FIG. 1 is a diagram of an illustrative system for in which one or more user devices can be used to perform mobile payment transactions in accordance with an embodiment.

FIG. 1 shows a diagram of a system 100 in which credential information can be provisioned onto one or more electronic devices from a payment network subsystem 122 using a service provider subsystem 112. User devices that have been provisioned with commerce credentials from payment network subsystem 122 may be used to conduct a financial transaction with a merchant terminal such as merchant terminal 108. User devices may, for example, communicate with merchant terminal 108 via contactless proximity-based communications (e.g., using near field communications (NFC) standards). Terminal 108 (sometimes referred to as a "point-of-sale" terminal) may include an NFC reader for detecting, reading, or otherwise receiving information from a nearby electronic device.

For example, a user may hold an electronic device within range of merchant terminal 108 to initiate a commercial transaction. Actual physical contact between the user device and the merchant terminal need not be present. While the electronic device is within range of merchant terminal 108 (e.g., when the user device is within 10 cm of terminal 108, when the user device is within 5 cm of terminal 108, when the user device is within 1 cm of terminal 108, or when the distance between the user device and the merchant terminal has other suitable values), the electronic device may send a selected commerce credential to merchant terminal 108. In response to receiving the selected commerce credential, merchant terminal 108 may complete the payment by forwarding the received commerce credential to a corresponding payment processor (not shown). The payment processor may utilize the user commerce credential to complete the transaction with payment network subsystem 122. This example in which payment transactions are performed via NFC is merely illustrative and does not limit the scope of the present invention. If desired, financial transactions between any two electronic devices may be carried out over Bluetooth® communications links, personal area network (PAN) communications links, wireless local area network (WLAN) communications links, or other short-range wireless communications links.

Payment network subsystem 122 may be operated by a financial entity that includes a network of various issuing banks and/or acquiring banks (e.g., payment processors). The financial entity at the payment network subsystem 122 may serve as a generic payment card association (e.g., a credit card association) that partners with one or more issuing/acquiring banks that are associated with different brands of commerce credentials and may sometimes be referred to as a payment network operator. The payment network operator and associated issuing/acquiring banks may be a single entity or separate entities.

For example, American Express may be both a payment network operator and an issuing/acquiring bank. As another example, Visa and MasterCard may be a payment network operator that partners with other issuing/acquiring banks such as Bank of America, Wells Fargo, and Chase, just to name a few. The issuing bank may be the financial institution that assumes primary liability for each user's capability to pay off debts incurred using a particular brand of payment card. Various types of payment cards that can be issued may include but are not limited to: credit cards, debit cards, charge charges, stored-value cards, fleet cards, and gift cards.

User payment card credentials may be provisioned from such financial entities onto user devices using a service provider subsystem such as service provider subsystem 112. Service provider subsystem 112 may be configured to provide another layer of security and/or to provide a more seamless user experience. For example, service provider subsystem 112 may be operated by a commercial service entity that offers various services to the user, which may include: an online store for selling/renting media to be played by the user device, an online store for selling/renting applications to be run on the user device, an online storage service for backing up and synchronizing data among multiple user devices, a remote device management service for tracking the location of the user device and remotely controlling that device, an online store that allows the user to purchase additional user devices or products (e.g., products manufactured by that commercial entity), etc. As another example, service provider subsystem 112 may be operated by a mobile network operator such as Verizon or AT&T.

In either scenario, the commercial entity at the service provider subsystem 112 may at least provide different users with their own personalized accounts for accessing the services offered by that commercial entity. Each user account may be associated with a personalized user identification (or account ID) and password that the user may use to log in into his/her account. Once logged in, the user may be presented with the opportunity to provision one or more commerce credentials (e.g., payment cards) onto the user device to enable the user device to purchase items using services offered by the commercial entity and/or to perform financial transactions at a merchant terminal 108.

In general, the commercial entity at the service provider subsystem 112 and the financial entity at the payment network subsystem 122 are considered separate entities. The commercial entity may leverage any known credential information associated with each of its user accounts to more securely determine whether a specific credential offered by the payment network operator ought to be provisioned onto a given user device. If desired, the commercial entity may also leverage its ability to configure or control various components of the user device (e.g., via software of firmware updates) in order to provide a more seamless experience for the user when he or she wants to provision a credential offered by the payment network operator onto a given user device.

As shown in FIG. 1, service provider subsystem 112 may include a broker module 114, a trusted service manager (TSM) module 116, and a network-based service module 118. Broker module 114 may serve to manage user authentication with a commercial entity user account and may also serve to manage the lifecycle and provisioning of credentials onto a user device. Broker module 114 may also be configured to control the user interface (e.g., the graphical user interface) that is displayed on the user device and to process any user inputs related to provisioning commerce credentials on the user device. When it is desired to provision a card onto the user device, broker module 114 may send a notification to payment network subsystem 122 via path 120.

In response to receiving the notification from broker module 114, payment network subsystem 122 may communicate directly with TSM module 116 to carry out credential provisioning operations on the user device. TSM 116 may serve to provide GlobalPlatform or other secure transactions based services so that TSM 116 can set up a secure channel between service provider subsystem 112 and a secure element within the user device. Commerce credential, payment card information, and/or other sensitive account data may then be conveyed to the secure element in the device via the secure channel. In general, TSM 116 may use public/private keys or other cryptographic schemes to ensure that communication between service provider subsystem 112 and the secure element within the user device is secure.

Network-based service module 118 may serve to allow users to store data such as music, photos, videos, contacts, multimedia messages, emails, calendars, notes, reminders, applications, documents, device settings, and other information on a network of computing servers so that data can be synchronized across multiple user devices (e.g., module 118 allows users to back up data that is stored on their devices onto servers associated with the service provider subsystem). This backup data can be used to restore a user device or to set up new user devices (as examples).

Network-based service module 118 may also be configured to allow users to find lost devices (sometimes referred to as a "Find My Device" feature), to share media among different devices, and/or to keep sensitive information (e.g., commerce credential information, website account login information, Wi-Fi® account information, etc.) up to date across different user devices. Any sensitive user information may be stored as part of a user "keychain" that can be stored on the user device(s) and/or on the network-based service module 118. Only the authorized user should have access to the keychain. Contents in the keychain may be protected using industry standard encryption techniques (e.g., using at least 128-bit AES encryption). Module 118 configured in this way is sometimes referred to as a "cloud" storage or cloud computing module.

Still referring to FIG. 1, a user may be in possession of multiple devices such as devices 10 and 102. Device 10 may be referred to as a "primary" user device, whereas device 102 may be referred to as a "secondary" user device. In general, the primary user device 10 may be provided with more functions than the secondary user device 102. For example, primary user device 10 may serve as the user's main device for use in accessing an entire array of services offered by service provider subsystem 112, for making telephone calls, for selecting new cards to be provisioned on one of devices 10 and 102, for capturing images, and for accessing the Internet, whereas secondary user device 102 may serve as an accessory device for use in accessing only a subset of the services provided by the commercial entity at the service provider subsystem 112. However, it should be understood that the terms "primary" and "secondary" are used for ease of description and that, in some instances, the "secondary" device implement functionality identical to or greater than the functionality implemented by the "primary" device.

Either one of primary user device 10 or secondary user device 102 can be used to perform a mobile payment transaction at merchant terminal 108. Each device that is capable of conducting such types of NFC-based financial transactions may be provided with a secure element. The secure element may be a tamper-resistant component (e.g., as a single chip or multichip secure microcontroller) that is capable of securely hosting applications and their confidential and cryptographic data in accordance with rules and security requirements set forth by well-identified trusted authorities such as GlobalPlatform. The secure element (SE) may be provided as a universal integrated circuit card (UICC), an embedded SE, a smart secure digital (SD) card, a microSD card, etc. Sensitive user information such as credit card information and other commerce credentials may be stored on the secure element. The secure element provides a secure domain that protects the user's credentials and processes desired payment transactions in a trusted environment without compromising the safety of the user's data. In general, each secure element may have its own unique identifier sometimes referred to herein as the SEID. No two secure elements should have the same SEID, and the SEID cannot be altered.

In one suitable arrangement, the user may operate the primary user device 10 to provision one or more payment cards directly on the primary user device. In such arrangements, credential information may be retrieved from the payment network subsystem 122 and/or the service provider subsystem 112 and may be downloaded to a secure element within device 10 via path 110. Path 110 between subsystem 112 and device 10 may be supported via cellular telephone radio communications protocols or other long-range wireless communications technologies and/or via Bluetooth®, IEEE 802.11 protocols—sometimes referred to as WiFi®, or other short-range wireless communications technologies.

In another suitable arrangement, the user may operate the primary user device 10 to indirectly provision one or more payment cards onto the secondary user device 102. In such scenarios, the provisioning of credentials onto the secondary device 102 may be managed using a secondary device credential management application (sometimes referred to as a "bridging" application) running on the primary user device 10. In such arrangements, payment network subsystem 122 may provide the desired payment card information that is then securely written into a secure element on the secondary device 102 via the primary user device 10 and path 106. The communications path 106 between primary user device 10 and secondary user device 102 may be supported via Bluetooth® (e.g., via Bluetooth Low Energy and/or Bluetooth "Classic" technologies), IEEE 802.11 protocols—sometimes referred to as WiFi®, or other short-range wireless communications technologies (as examples). In yet other suitable arrangement, secondary device 102 may communicate directly with service provider subsystem 112 to obtain commerce credentials using any suitable long-range or short-range wireless communications standards (as indicated by path 111).

Figure 2A:
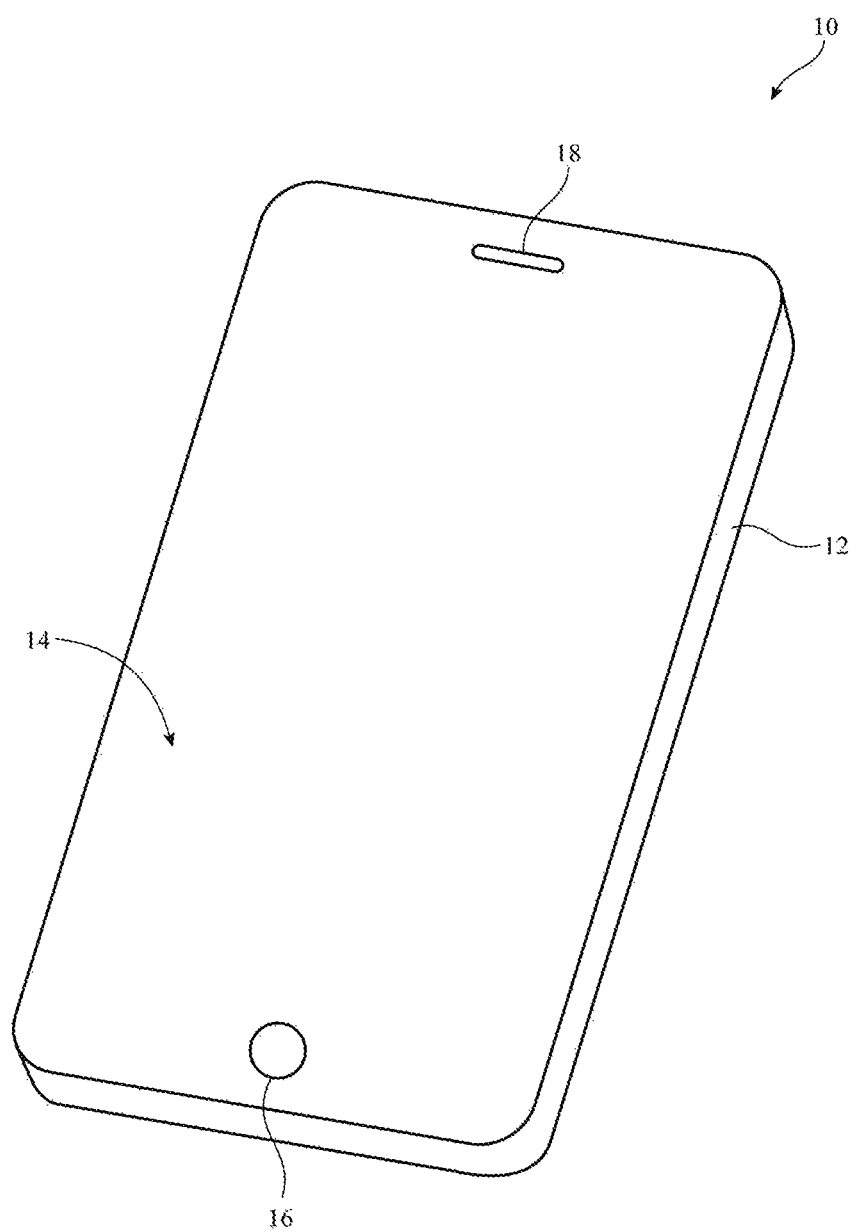
FIG. 2A is a perspective view of an illustrative primary user device in accordance with an embodiment.

FIG. 2A shows a perspective view of primary user device 10. Device 10 may be a portable device such as a cellular telephone, media player, tablet computer, or other portable computing device. The example of FIG. 2A is merely illustrative. Other configurations may be used for device 10, if desired. As shown in FIG. 2A, device 10 may include a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2B:
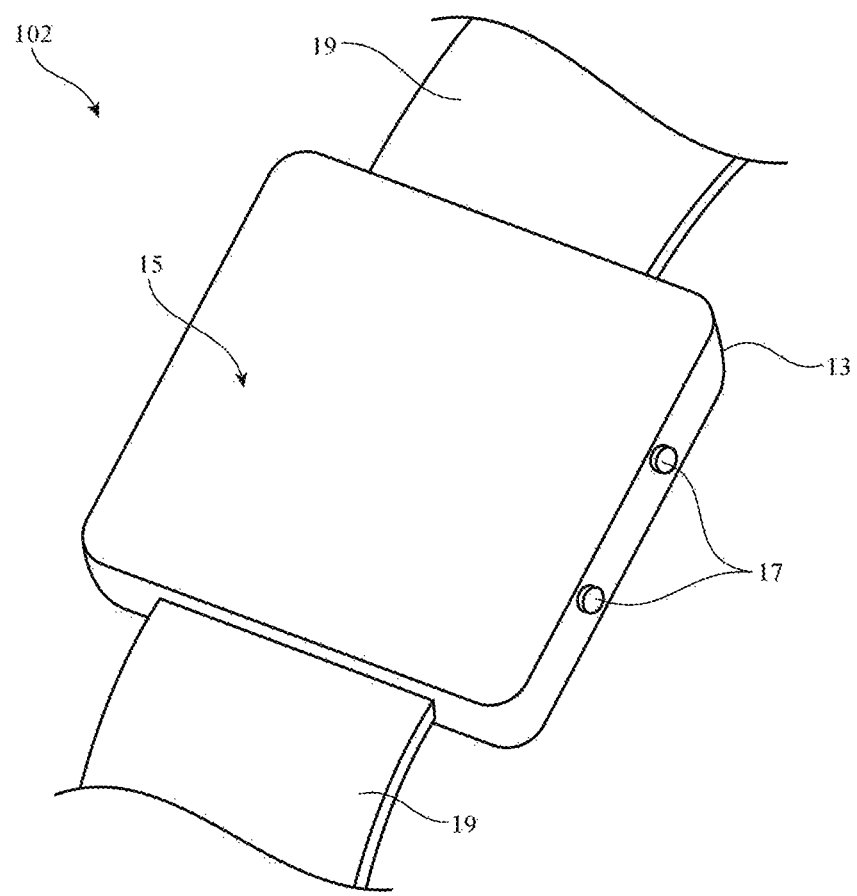
FIG. 2B is a perspective view of an illustrative secondary user device in accordance with an embodiment.

FIG. 2B shows a perspective view of a secondary user device 102. Electronic device 102 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In at least some embodiments, secondary user device 102 serves as an auxiliary device to primary device 10, where device 102 can be used to perform specialized functions for the user.

The example of FIG. 2B in which device 102 is shown as a wearable device such as a wrist-watch device with straps 19 is merely illustrative. As shown in FIG. 2B, device 102 may include a display such as display 15. Display 15 has been mounted in a housing such as housing 13. Housing 13, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 13 may be formed using a unibody configuration in which some or all of housing 13 is machined or molded as a single structure or may be formed using multiple structures (e.g., an internal frame structure, one or more structures that form exterior housing surfaces, etc.).

Display 15 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 15 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 15 may be protected using a display cover layer such as a layer of transparent glass or clear plastic.

Device 102 may have one or more buttons 17 which may be used to gather user input. Buttons 17 may be based on dome switches or other switch circuitry. Buttons 17 may include button members that form push buttons (e.g., momentary buttons), slider switches, rocker switches, etc. Device 10 may also have additional buttons, a speaker port, data ports such as a digital data port and an audio connector port, and/or other input-output devices, if desired. In some embodiments, at least one of buttons 17 on the secondary user device 102 may be used to enable device 102 to perform a secure mobile transaction.

Figure 3:
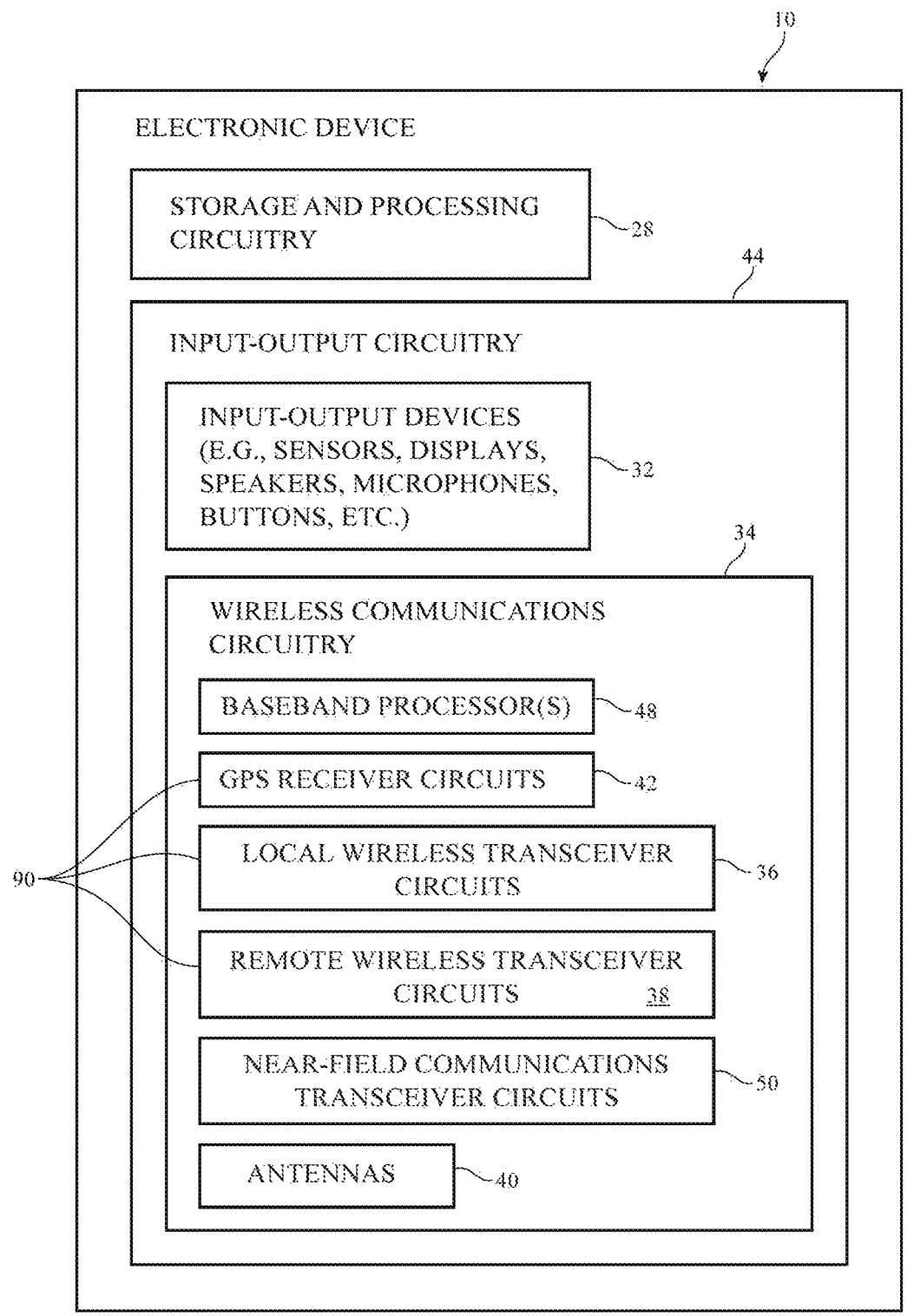
FIG. 3 is a schematic diagram of illustrative circuitry in the primary user device of FIG. 1 in accordance with an embodiment.

A schematic diagram showing illustrative components that may be used in device 10 is shown in FIG. 3. As shown in FIG. 3, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, secondary device credential management applications, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36 and 38. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 may also include satellite navigation system circuitry such as global positioning system (GPS) receiver circuitry 42 for receiving GPS signals at 1575 MHz or for handling other satellite positioning data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may also include near-field communications circuitry 50. Near-field communications circuitry 50 may produce and receive near-field communications signals to support communications between device 10 and a near-field communications reader or other external near-field communications equipment. Near-field communications may be supported using loop antennas (e.g., to support inductive near-field communications in which a loop antenna in device 10 is electromagnetically near-field coupled to a corresponding loop antenna in a near-field communications reader). Near-field communications links typically are generally formed over distances of 20 cm or less (i.e., device 10 must be placed in the vicinity of the near-field communications reader for effective communications).

Transceiver circuitry 90 and NFC circuitry 50 may be coupled to one or more baseband processors 48. Baseband processor 48 may receive digital data to be transmitted from circuitry 28 and may supply corresponding signals to at least one of wireless transceiver circuits 90 for wireless transmission. During signal reception operations, transceiver circuitry 90 and NFC circuitry 50 may receive radio-frequency signals from external sources (e.g., wireless base stations, wireless access points, GPS satellites, NFC readers etc.). Baseband processor 48 may convert signals received from circuitries 90 and 50 into corresponding digital data for circuitry 28. The functions of baseband processor 48 may be provided by one or more integrated circuits. Baseband processor 48 is sometimes considered to be part of storage and processing circuitry 28.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near-field communications. The structures of antennas 40 may also be used in gathering proximity sensor signals (e.g., capacitive proximity sensor signals).

Radio-frequency transceiver circuitry 90 does not handle near-field communications signals and is therefore sometimes referred to as "far field" communications circuitry or non-near-field communications circuitry (e.g., transceiver circuitry 90 may handle non-near-field communications frequencies such as frequencies above 700 MHz or other suitable frequency). Near-field communications transceiver circuitry 50 may be used in handling near-field communications. With one suitable arrangement, near-field communications can be supported using signals at a frequency of 13.56 MHz. Other near-field communications bands may be supported using the structures of antennas 40 if desired.

Figure 4:
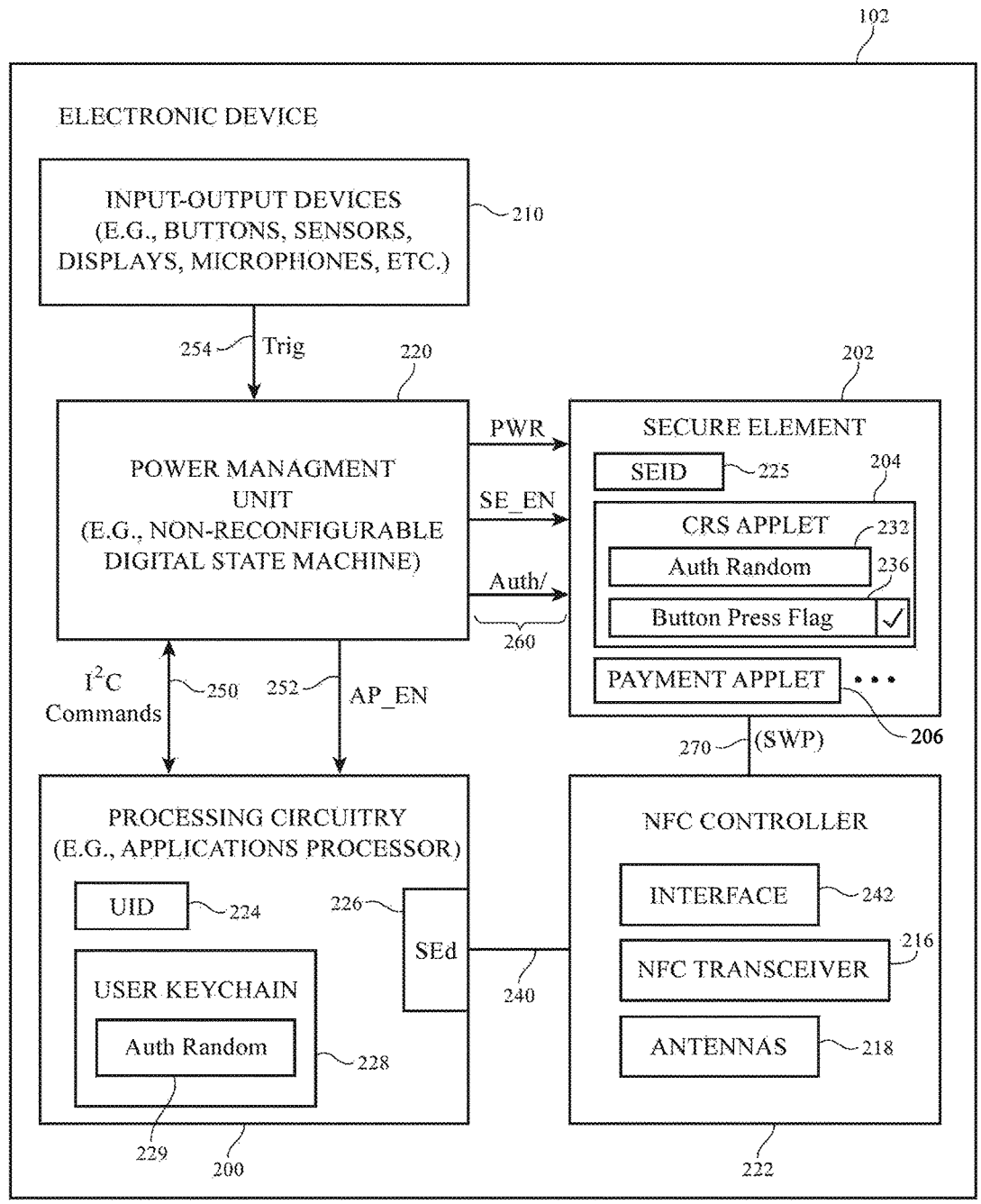
FIG. 4 is a schematic diagram of illustrative circuitry in the secondary user device of FIG. 1 in accordance with an embodiment.

A schematic diagram showing illustrative components that may be used in the secondary user device 102 is shown in FIG. 4. As shown in FIG. 4, device 102 may include control circuitry such as a main processor (sometimes referred to herein as the applications processor or AP) 200, input-output devices 210, a power management unit (PMU) such as power management unit 220, a secure element such as secure element 202, and an NFC controller 222. Applications processor 200 may be used to control the operation of device 102 and may access storage such as hard disk drive storage, nonvolatile memory (e.g., flash memory or other electrically-programmable-read-only memory configured to form a solid state drive), volatile memory (e.g., static or dynamic random-access-memory), etc. In general, processor 200 may be used to run software on device 102, such as internet browsing applications, voice-over-internet-protocol (VOIP) telephone call applications, email applications, media playback applications, operating system functions, etc. The applications processing circuitry may be based on one or more microprocessors, microcontrollers, digital signal processors, application specific integrated circuits, etc.

Applications processor may be coupled to power management unit 220 via paths 250 and 252. PMU 220 may, for example, be a microcontroller that governs the power functions for device 102. The PMU 220 should remain active (e.g., using a backup battery source) even when the rest of device 102 is idle or powered down. The PMU 220 may be responsible for functions including but not limited to: monitoring power connections and battery charges, controlling power to other circuit components within device 102, shutting down unnecessary system components when they are left idle, controlling sleep and on/off power functions, and/or actively managing power consumption for optimum user performance.

In the example of FIG. 4, PMU 220 is coupled to applications processor 200 (via paths 250 and 252) and to secure element 202 (via paths 260) and may be configured to selectively put these components to sleep or to wake these components up from sleep mode. As an example, PMU 220 may assert an enable signal AP_EN on path 252 to wake up the applications processor and may exchange information with applications processor via path 250. Path 250 may be an I²C bus or any other suitable bus type. As another example, PMU 220 may assert an enable signal SE_EN on one of paths 260 to wake up the secure element and may also send power and other control signals (e.g., signals PWR and Auth/) to the secure element via other paths 260. Communications between PMU 220 and secure element 202 may be implemented using a general-purpose input/output (GPIO) interface, a programmed input/output (PIO) interface, an I²C interface, a Serial Peripheral Interface (SPI), and/or other types of communications interface.

As shown in FIG. 4, PMU 220 may also be coupled to input-output devices 210 via path 254 and may also be configured to manage the I/O interface of device 102. Input-output devices 210 may be used to allow data to be supplied to device 102 and to allow data to be provided from device 102 to external devices. For example, input-output devices 210 may include user interface devices, data port devices, and other input-output components. Input-output devices 210 may include buttons, biometric sensors (e.g., a fingerprint sensor, a retinal sensor, a palm sensor, a signature-identification sensor, etc.), touch screens, displays without touch sensor capabilities, joysticks, click wheels, scrolling wheels, touch pads, key pads, keyboards, microphones, cameras, speakers, status indicators, light sources, audio jacks and other audio port components, digital data port devices, light sensors, motion sensors (accelerometers), capacitance sensors, proximity sensors, etc.

Consider a scenario in which device 102 has its display 15 turned off when device 102 is completely stationary. In response to detecting any motion at device 102 (e.g., using an accelerometer in devices 210), the accelerometer may send a corresponding signal to the PMU 220 via path 254. This signal may then direct PMU 220 to send another signal to applications processor 200 that results in the display being turned on to output some useful information such as the current time to the user of device 102 (as an example).

Consider another scenario in which secure element 202 is normally placed in an inactive state. In response to detecting input from the user that is indicative of the desire to perform a financial transaction (sometimes referred to as a "payment activation input" or a "payment initiation input"), one or more components in devices 210 may send a signal to PMU 220 via path 254, which in turn directs PMU 220 to send a wakeup signal to secure element 202 via path 260. Once the secure element 202 has been awakened, other operations can subsequently be performed to complete the financial transaction. These examples are merely illustrative. If desired, PMU 220 may be configured to handle other types of user input to provide device 102 with the optimum power savings.

Still referring to FIG. 4, NFC controller 222 may be interposed between the applications processor 200 and the secure element 202. NFC controller 222 may include an interface circuit 242 for linking applications processor 200 to secure element 202 (e.g., via paths 240 and 270). Path 240 linking applications processor 200 and NFC controller 222 may be implemented using a universal asynchronous receiver/transmitter (UART) bus, a Universal Serial Bus (USB), a serial ATA (SATA) bus, and/or other suitable types of computer buses for coupling an applications processor to a wireless network controller. On the other hand, path 270 may support communications between secure element 202 and NFC controller 222 using the Single Wire Protocol (SWP), the NFC wired interface (NFC-WI) protocol, the I²C protocol, or other suitable communications protocol for linking a secure element to a near field communications component.

In accordance with an embodiment, applications processor 200 may serve as a "trusted processor" for communicating with secure element 202 via a secure channel. During a mobile payment transaction, secure element 202 may forward an encrypted version of a commerce credential that is stored on the secure element externally to an NFC reader at merchant terminal 108 (FIG. 1) using an NFC transceiver 216 and antenna(s) 218 within controller 222. Antennas 218 may be formed using any suitable antenna types. For example, antennas 218 may include antennas with resonating elements that are formed from loop antenna structures, patch antenna structures, inverted-F antenna structures, slot antenna structures, planar inverted-F antenna structures, helical antenna structures, hybrids of these designs, etc.

This is merely illustrative. In general, device 102 may include also one or more baseband processors for handling NFC protocols, wireless local area network protocols (e.g., IEEE 802.11 protocols—sometimes referred to as WiFi®), protocols for other short-range wireless communications links such as the Bluetooth® protocol, cellular telephone protocols, internet protocols, MIMO protocols, antenna diversity protocols, etc. The baseband processing circuitry may be coupled to near-field communications circuitry 216 for producing and receiving near-field communications signals at 13.56 MHz to support communications between device 10 and/or a near-field communications reader or other external near-field communications equipment, wireless local area network transceiver circuitry for handling the 2.4 GHz and 5 GHz bands for WiFi® (IEEE 802.11) communications and the 2.4 GHz Bluetooth® communications band, and/or other suitable types of wireless transmitters/receivers for supporting short-range wireless links and long-range wireless links. If desired, device 102 may also include a satellite navigation system receiver, a cellular telephone transceiver, and/or any type of transmitter and receiver circuitry configured to support any desired wireless communications protocols.

Still referring to FIG. 4, secure element (SE) 202 may be provided with one or more applications or "applets" that run as part of the operating system of secure element 202 (e.g., as a plug-in to a Java runtime environment executing on SE 202). For example, secure element 202 may include an authentication applet 204 that provides contactless registry services (CRS), encrypts/decrypts data that is sent to and received from a trusted processor, sets one or more control flags in the operating system of secure element 202, and/or manages one or more associated payment applets 206 (e.g., payment applets 206-1, 206-2, etc.) on secure element 202. Authentication applet 204 is therefore sometimes referred to as a CRS applet. Commercial credentials associated with a given payment card may be stored in a particular "container" on secure element 202, which is basically the instantiation of a payment applet combined with the encrypted payment data for that instantiation. For example, if two Visa cards are to be provisioned onto the secure element, a Visa payment applet would be instantiated twice into two different containers on the secure element. Each container may have a unique identifier known as an application ID (or AID).

CRS applet 204 may be executed in a master or "issuer" security domain (ISD) in secure element 202, whereas payment applet(s) 206 may be executed in supplemental security domains (SSDs). For example, keys and/or other suitable information for creating or otherwise provisioning one or more credentials (e.g., credentials associated with various credit cards, bank cards, gift cards, access cards, transit passes, etc.) on device 102 and/or for managing credential content on device 102 may be stored on the CRS applet 204. Each payment applet 206 may be associated with a specific credential (e.g., a specific credit card credential, a specific public transit pass credential, etc.) that provide specific privileges or payment rights to device 102. Communications between these security domains may be encrypted using different encryption/decryption keys that are security-domain specific (e.g., each SSD may have its own manager key associated with a respective payment applet 206 that is used to activate/enable a specific credential of that SSD for use during an NFC-based transaction at merchant terminal 108).

In one suitable arrangement, applications processor 200 on secondary user device 102 may be configured to run a mobile payments application. This payments application may allow the user to store credit cards, debit cards, retail coupons, boarding passes, event tickets, store cards, gift cards, loyalty cards, generic cards, and/or other forms of mobile payment. Each of these digital cards, coupons, or tickets is sometimes referred to as a "pass." As a result, the mobile payments application is sometimes referred to as a "passbook" application or a digital wallet application. The passbook application may include passes corresponding to respective payment applets 206 for use in conducting a financial transaction. Each pass (sometimes referred to herein as passbook pass, a digital wallet pass, etc.) in the passbook may be either in an activated (or personalized) state or a disabled (non-personalized or personalizing) state. A personalized pass may indicate that a corresponding payment applet 206 has been provisioned with the desired commerce credential and is ready for payment. A non-personalized pass may indicate that a corresponding payment applet 206 has not yet been provisioned with the necessary commerce credential and is therefore not payment-ready.

In one suitable embodiment, secure element 202 may be paired with one corresponding trusted processor such as processor 200 using an authorization key or "AuthKey." This pairing of a secure element with a trusted processor using AuthKey should only be performed once during the manufacturing of these components. The AuthKey for a given secure element and trusted processor pair may be derived based on an unique SEID 225 of the secure element in that given pair and/or a unique identifier (UID) 224 of the trust processor in that given pair. The AuthKey serves as a component-level secret key that is unknown to the user and serves to bind a secure element to a corresponding processor so the secure element knows who to trust (e.g., the AuthKey helps to set up a secure channel between the secure element and the associated applications processor 200).

The AuthKey can be stored within the secure element (e.g., the AuthKey may be managed by the CRS applet 204) but need not be stored at the applications processor 200. The applications processor on the secondary user device 102 may be capable of re-deriving the AuthKey on-the-fly when it needs to communicate with the paired secure element based on at least one of its own UID 224 and/or the SEID 225 obtained from the corresponding secure element.

While the AuthKey effectively binds the secure element 202 to the trusted processor 200, a random authorization number "AuthRand" may be used to bind the user to the trusted processor 200. AuthRand may be a randomly generated number that is stored on the user keychain (e.g., AuthRand 229 may be stored as part of keychain 228 that is maintained at the applications processor 200). As described above in connection with FIG. 1, the user keychain 228 may include information that is only related to a particular user.

Figure 5:
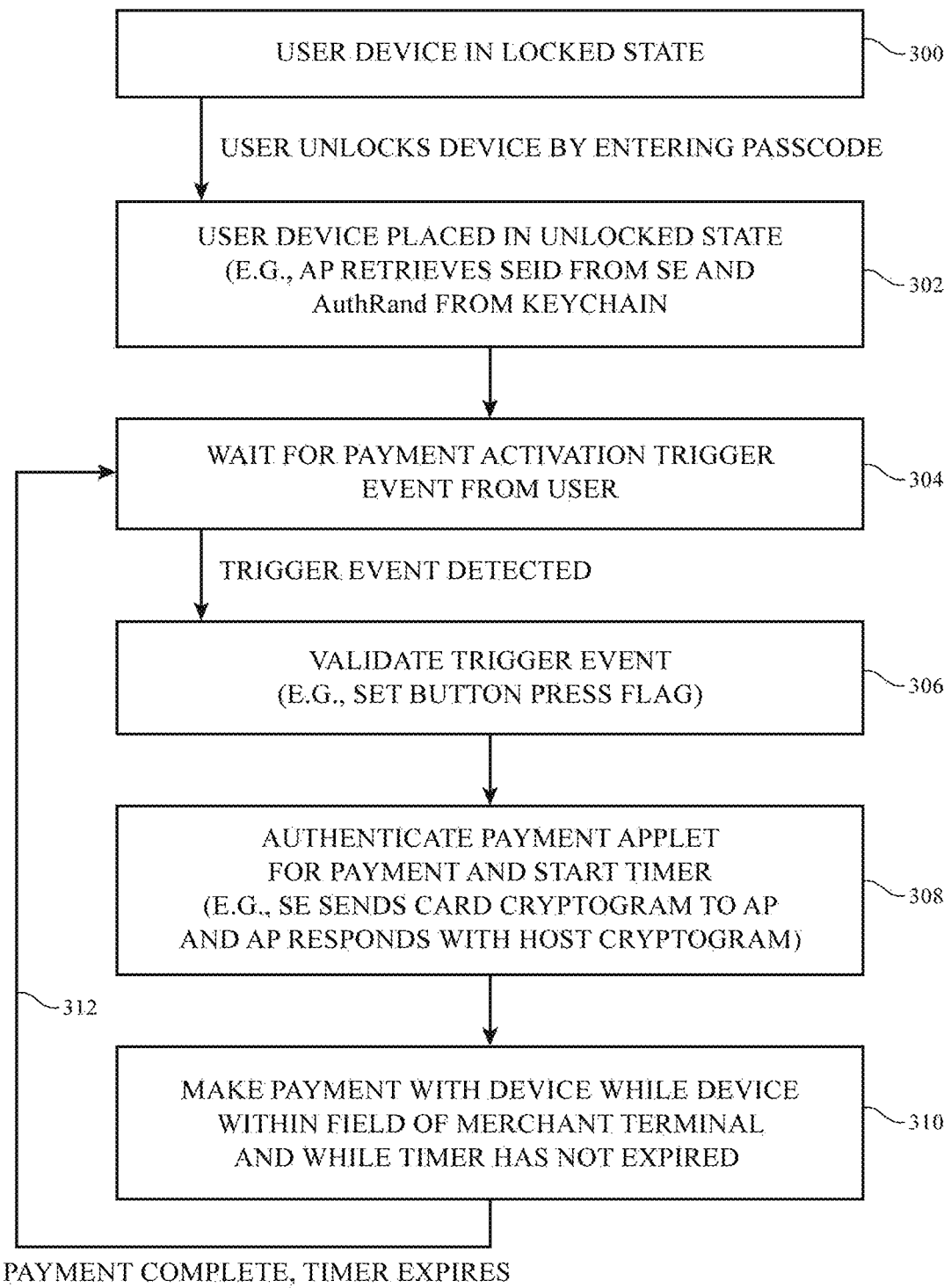
FIG. 5 is a flow chart of illustrative steps involved in activating a user device for mobile payment in accordance with an embodiment.

As shown in FIG. 5, AuthRand can also be stored within the secure element (e.g., AuthRand 232 may be managed at the CRS applet 204). In general, the trusted processor may be configured to generate a new AuthRand value and to inject the newly generated AuthRand value into the corresponding secure element 202 (e.g., by overwriting the old AuthRand value on the secure element with the newly generated AuthRand value) in response to detecting an ownership change at the user device. Operated in this way, the trusted processor (e.g., applications processor 200) serves to locally track any ownership change at user device 102 by monitoring the status of the user keychain (as an example). Any currently activated payment applets 206 on secure element 202 should be immediately deactivated for payment in response to detecting injection of a new AuthRand. Configured in this way, the protection of sensitive user credentials at the secure element is enhanced by ensuring that a new user obtaining device 102 as a result of an ownership change (whether or not the ownership change is intended) will not be able to use the newly acquired device to perform mobile transactions commerce credentials associated with the original user. In general, trusted processor 200 may be provided with a secure element daemon (SEd) 226 that handles any communications with the secure element 202 via the NFC controller 222.

Still referring to FIG. 4, the CRS applet 204 may also include one or more control flags for use in activating payment applets 206 on the secure element 202. For example, CRS applet 204 may include a "button pressed" flag 236. The button pressed flag 236 may be used to indicate whether the user has pushed a button 17 on user device 102 (see, FIG. 2B). For example, the default value for the button pressed flag is '0.' When device 102 has detected that a user has pressed button 17, the button pressed flag may be set to a value of '1' (i.e., the button pressed flag may be asserted). In one suitable arrangement, the button pressed flag may only be set to '1' if the user double presses button 17. In another suitable arrangement, the button pressed flag may only be asserted if the user triple presses a button 17. In yet another suitable arrangement, the button pressed flag may only be asserted if the user holds down button 17 for more than one second, for more than two seconds, for more than three seconds, etc.

In general, flag 236 serves as a flag that is asserted in response to detecting some predetermined user input sequence for initiating operations that need to be carried out in order for device 102 to perform a mobile payment transaction. The button pressed flag 236 is therefore merely illustrative and does not serve to limit the scope of the present invention. If desired, other ways of allowing the user to initiate payment at a merchant terminal may be implemented. Additionally or alternatively, CRS applet 204 may be provided with a "fingerprint detected" flag that is asserted when a fingerprint sensor on devices 102 detects the fingerprint of an authorized user, a "swipe detected" flag that is asserted when a touchscreen on device 102 receives a particular swiping motion from the authorized user, a "tap detected" flag that is asserted when a touchscreen on device 102 receives a double tap from the authorized user, a "buttons pressed" flag that is asserted when multiple buttons on device 102 are simultaneously pressed by the authorized user, a "voice command received" flag that is asserted when a microphone on device 102 detects a voice command from the authorized user (e.g., if the user says "pay"), and/or other suitable flags. Flag 236 may therefore sometimes be referred to generally as a "user input" flag or a "user input received" flag.

In general, when an electronic device is acquired by a new user, the electronic device may prompt the new user to set up an account with the service provider subsystem (e.g., subsystem 112 in FIG. 1). For example, the user may be given the opportunity to enter an account identifier (ID) and a corresponding password to set up a new account. Once the account has been set up, the device may be considered to be personalized to that user and the user may now operate the device to play music, capture photos/videos, record voice memos, store contact information, send/receive multimedia messages, browse the Internet, view/edit calendars, notes, reminders, and other documents, change device settings, provision one or more payment cards onto the device, buy/rent media from an online store, buy/rent applications from an online store, and/or access other services offered by the service provider subsystem. In at least some embodiments, any information that is related to the user and the user device may be stored on a network-based service module (e.g., module 118 in FIG. 1) as backup.

In order for the user to be able to provision payment cards onto the user device, the user may have to enable a passcode lock function on the device. The passcode lock function, when enabled, would require the user to enter a four digit passcode in order to fully operate the device (as an example). This is merely illustrative. The user may be directed to enter a passcode that is less than four digits in length, a passcode that is more than four digits in length, or a passcode that includes numbers, alphabet characters, and/or symbols of any arbitrary length. In general, any form of authentication method may be implemented. If the user is not able to provide the correct passcode, the device will remain in a locked state in which only a limited function such as an emergency call function is accessible (as an example). If the user is able to provide the correct passcode, the device will be temporarily placed in an unlocked state in which all the normal functions of the device is accessible to the user.

When the user is done performing a certain task with the device, the user may signal the device to return to the locked state (e.g., by pressing a button on the device). The device may also automatically return to the locked state when the device has been idle for a predetermined period of time (e.g., the device may be automatically locked if the device has been idle for more than thirty seconds, for more than a minute, for more than two minutes, etc.). The passcode function serves to protect any user information that is normally accessible through the device, since only the intended user should be able to unlock his or her device. The passcode may be locally maintained at the applications processor (e.g., in the keychain 228 on applications processor 200) and/or may be stored remotely at the service provider subsystem.

Requiring the user to enter a passcode can therefore help to ensure that the current user is the intended authorized user of that device assuming only the authorized user has access to the correct passcode. In the context of mobile payments, only the authorized user should be able to perform any financial transaction with a device that has been provisioned with his or her commerce credentials. It would therefore be desirable for an electronic device such as device 10 of FIG. 2A or device 102 of FIG. 2B to require a user to enter the passcode at least once when using the device.

FIG. 5 is a flow chart of illustrative steps involved in activating a user device such as user device 102 for mobile payment. At step 300, user device 102 may be placed in a locked state. Upon receiving a correct passcode from the authorized user, the user device may be placed in an unlocked state (step 302). During step 302, applications processor 200 in device 102 may retrieve the SEID from the secure element and may retrieve the random authorization value AuthRand from the user keychain. In general, step 302 may be formed at any time before a payment transaction is complete.

At step 304, device 102 may be configured to wait for a payment activation trigger event from the authorized user (e.g., device 102 may be configured to monitor for a predetermined user input sequence or action that clearly demonstrates the user's intent to initiate a payment). For example, device 102 may be waiting for the user to issue a double press at one of buttons 17 (see, FIG. 2B), to issue a particular swiping motion on the touchscreen display 15, to issue a double tap on the touchscreen display 15, to issue a voice command, and/or other suitable action that can be deliberately taken by the user at device 102.

This requirement for device 102 to receive a particular payment initiation input from the user can help prevent the occurrence of unintentional mobile payment transactions from an authorized user. Consider a scenario in which a user has already unlocked the device but does not actually wish to perform a financial transaction. If such a user inadvertently brings the unlocked device into sufficient proximity with a merchant terminal, an unintentional mobile payment transaction can potentially be performed. Such scenarios can be avoided if the user needs to take deliberate action to indicate to the device that he or she actually wishes to carry out the payment.

In response to receiving a desired payment triggering input from the user, device 102 may proceed to validate the trigger event and to set a corresponding control flag at the CRS applet in the secure element (step 306). At step 308, the CRS applet may authenticate a selected payment applet 206 for payment and may start a timer. The timer may be used to set forth a period of time within which mobile payment transactions are allowed as long as the user device is brought within the field of the merchant terminal. For example, the user may be given 10 seconds following the activation trigger event to bring the device within the reader field. As another example, the user may be given 20 seconds following the activation trigger event to bring the device within the NFC reader field. In general, the timer may be configured to provide a time limit of any suitable duration.

During step 308, the secure element may send a card cryptogram to the applications processor, and the applications processor may respond with a host cryptogram. As an example, the card and host cryptograms may be encrypted using a cipher-based message authentication code (CMAC) algorithm that assures the authenticity of the data that is being exchanged between the applications processor and the secure element. The card and host cryptograms may, for example, include data that is encrypted using an AuthKey that only the secure element and the corresponding trusted processor should be able to access. Operated in this way, the exchange of cryptograms serves to verify that the applications processor is talking to the right secure element, and that the secure element is talking to its trusted processor.

At step 310, device 102 may be used to carry out the desired transaction while the user device is within the field generated by the NFC reader at the merchant terminal (assuming the timer has not expired). If, however, the timer expires before the user has had a chance to bring the device into the reader field, no payment will be completed. In either scenario, processing will return to step 304 to wait for another payment activation/initiation trigger event, as indicated by path 312.

Figure 6:
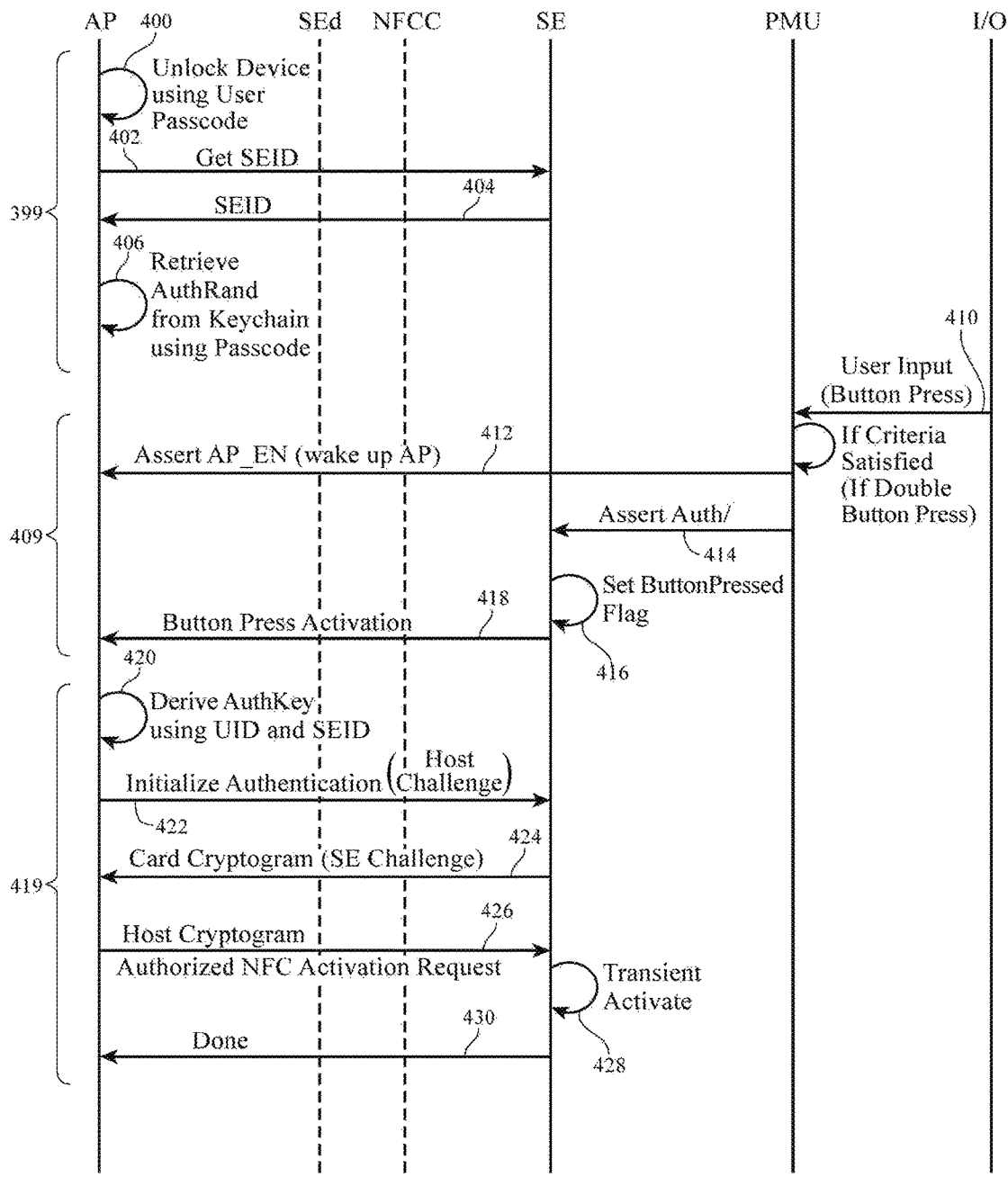
FIG. 6 is a diagram illustrating the flow of information between different components within a user device during payment activation operations in accordance with an embodiment.

FIG. 6 illustrates the flow of information between the different components in device 102 when performing the steps of FIG. 5. At step 400, device 102 may be unlocked by the authorized user (e.g., the authorized user may enter the correct passcode). The passcode may be verified using the keychain on the applications processor (AP) and in response, the applications processor may place the user device in the unlocked state.

At step 402, the applications processor may send a "Get SEID" request to the secure element. As described above in connection with FIG. 4, any message that is conveyed between the applications processor and the secure element may be handled by the secure element daemon (SEd) and may pass through the NFC controller 222. In response to receiving the Get SEID request from the applications processor, the secure element may send back its SEID in encrypted format.

At step 406, the applications processor on device 102 may then retrieve the random authorization number AuthRand from the user keychain. Since AuthRand is protected by the user keychain, AuthRand may only be accessed after a correct passcode has been provided at step 400.

As shown in FIG. 6, steps 400, 402, 404, and 406 are grouped together as steps 399. In general, steps 399 may be performed any time the device has been idle for an extended period of time. For example, consider a scenario in which device 102 is a wrist-watch device that the user removes at the end of the day and that the user puts on his/her wrist at the beginning of the day. In this example, steps 399 may only be performed at the beginning of the day when the user puts on the device (e.g., the user should not need to repeatedly enter the passcode throughout the day as long as the device stays on the wrist).

Performing steps 399 only once per day may be desirable for the user since repeatedly having to enter the passcode multiple times a day can be tedious. In other words, steps 399 may be performed once when the user obtains the device and should only be performed again when an event occurs that can potentially result in a change in ownership of the device (e.g., any scenario in which it is possible for the device to be in possession of a user that is different than the original authorized user should trigger the device to be placed in the locked state).

At any point in time, device 102 may receive a deliberate user input at an I/O device 210 that demonstrates the user's clear intent to carry out a mobile payment transaction. At step 410, I/O device 210 may send a corresponding user input trigger signal to the power management unit. In at least some embodiments, the deliberate user input may be a button press event such as a double button press event. Any description relating to a button press event for triggering a payment activation herein is merely illustrative and does not serve to limit the scope of the present invention. As described above, any other type of user input may be used to trigger the activation of the secure element.

In response to detecting the proper user input, the power management unit may proceed to wake up the applications processor by asserting enable signal AP_EN on path 252 (see, FIG. 4). The applications processor may normally be placed in an idle mode when the applications processor is not actively running any applications on device 102. At step 414, the power management unit may then output an asserted user input authentication signal Auth/ to the secure element on one of paths 260. When the secure element sees that Auth/ is asserted, the payment activation trigger event has been verified, and the secure element may then proceed to set the button pressed flag high (at step 416). Once the button pressed flag has been set high (or other "user input received" control flag has been asserted using the CRS applet), the secure element may send a button press activation event status word (or a "user input received" notification) to the applications processor to notify the applications processor that a valid user payment activation input has been received (at step 418).

As shown in FIG. 6, steps 410, 412, 414, 416, and 418 are grouped together as steps 409. In general, steps 409 may be performed any time the device receives a valid user payment activation input from the user.

In response to receiving the button press activation notification from the secure element, the applications processor may proceed to derive the AuthKey using its own UID and/or using the SEID received during step 404. The application processor may use this derived AuthKey to effectively set up a secure channel with the secure element.

At step 422, the applications processor may send an authentication initialization command to the CRS applet within the secure element. During this step, the applications processor may also send a first random number to the secure element. The applications processor is sometimes referred to as the host processor; in such scenarios, the first random number generated by the applications processor is sometimes referred to as a "host challenge." The host challenge is not the same as random number AuthRand.

In response to receiving the host challenge from the applications processor, the secure element may respond by sending a card cryptogram to the applications processor (at step 424). In one suitable arrangement, the card cryptogram may include the received host challenge, a second random number that is generated by the secure element (sometimes referred to herein as a "card challenge" or a "secure element challenge"), the AuthRand stored locally at the secure element (e.g., AuthRand 232 at CRS applet 204 in FIG. 4), and other suitable control bits. The SE challenge is not the same as random number AuthRand. As an example, the card cryptogram may be encrypted using the CMAC algorithm published by the National Institute of Standards and Technology (NIST). In at least some arrangements, the CMAC algorithm may use at least the AuthKey to encrypt the card cryptogram.

When the applications processor receives the card cryptogram from the secure element, the applications processor may decode the card cryptogram using its own derived AuthKey (e.g., the AuthKey derived during step 420) and may be configured to at least compare the AuthRand value in the card cryptogram to the locally retrieved AuthRand (e.g., the AuthRand value retrieved from the user keychain during step 406). If the AuthRand values match, then the applications processor will able to proceed with authenticating the secure element for payment.

At step 426, the applications processor may send a host cryptogram to the secure element. The host cryptogram may, for example, include the host challenge, the received SE challenge, its local AuthRand value (e.g., the AuthRand value retrieved during step 406), and other suitable control bits. The host cryptogram may also be encrypted with the CMAC algorithm using the derived AuthKey.

When the secure element receives the host cryptogram from the applications processor, the secure element may decode the host cryptogram using the AuthKey at the CRS applet and may compare the received AuthRand value in the host cryptogram to its own AuthRand value stored at the CRS applet. If the AuthRand values match, then the secure element will proceed to temporarily activate a selected payment applet for a financial transaction (at step 428). As described previously in connection with FIG. 5, a timer can be started at this time to give the user an opportunity to bring the device within the reader field to perform a financial transaction with the activated payment applet. The host cryptogram may therefore serve as an authorized NFC activation request that directs the secure element to enable a payment applet. The act of enabling a payment applet to conduct a transaction is sometimes referred to as a transient activate operation. When a mobile payment transaction is complete (or when the timer expires), the currently activated payment applet may be deactivated using the CRS applet (step 430).

As shown in FIG. 6, steps 420, 422, 424, 426, 428, and 430 are grouped together as steps 419. In general, steps 419 may be performed any time the applications processor receives a button press activation notification (or other a valid user payment activation input alert) from the secure element.

As described above, a large part in arming user device 102 to perform a mobile payment transaction hinges upon the ability to accurately detect a deliberate user input such as a double button press (as an example). The detection of such user input may be handled by the power management unit (e.g., PMU 220 in FIG. 4). In general, the power management unit may be a non-reconfigurable digital state machine that does not actually run any software. Because the power management unit does not actually run any software, the power management unit cannot be easily hacked. As a result, it is difficult for malicious software (or "malware") to take control of the PMU to send false notifications to either the applications processor and/or the secure element.

Figure 7:
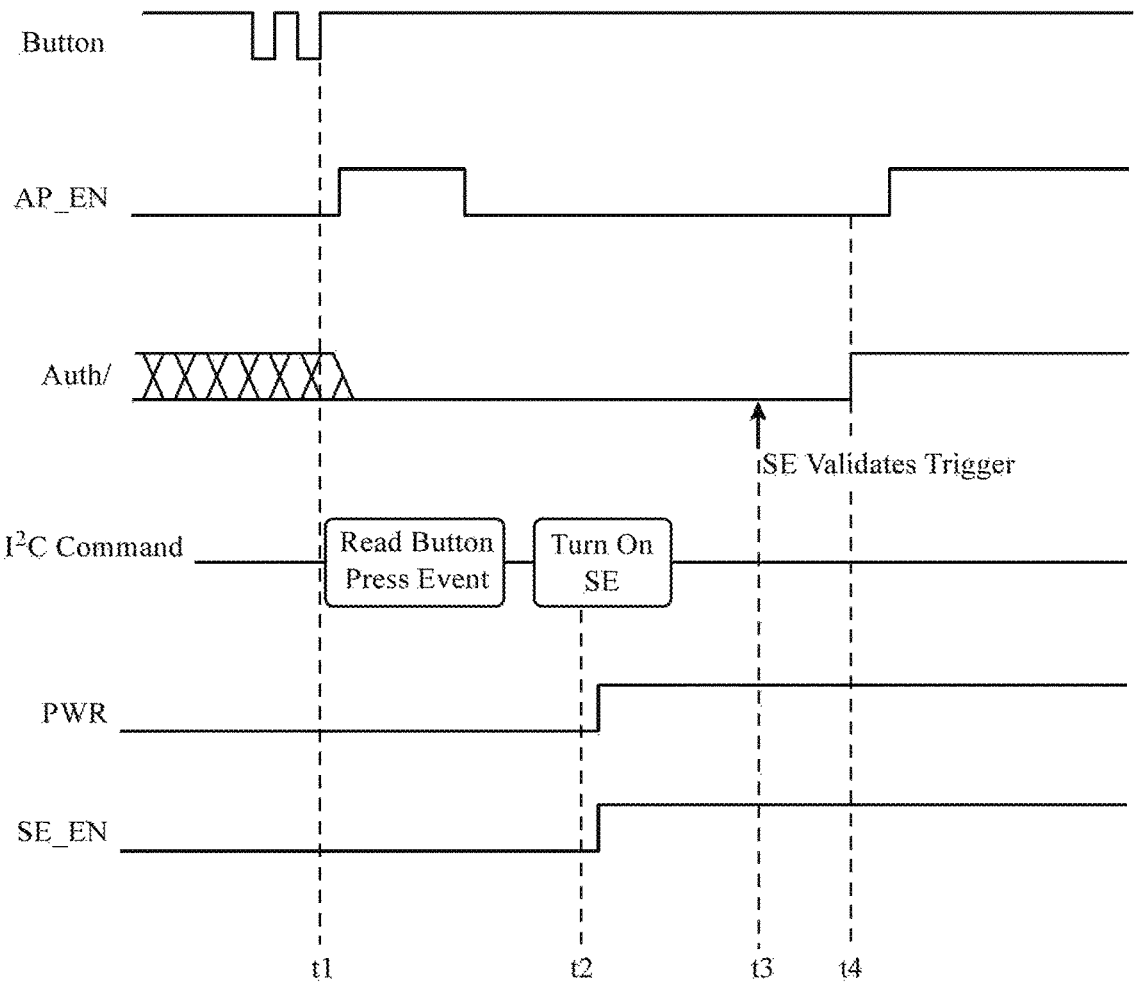
FIG. 7 is a timing diagram illustrating a sequence of events that is triggered by a predetermined user input in accordance with an embodiment.

FIG. 7 is a timing diagram illustrating a sequence of events that is triggered by a payment activating user input. These events may correspond at least partly with steps 409 of FIG. 6. At time t1, the power management unit may detect a double button press (e.g., the power management unit may receive a double button press trigger signal from the input-output devices 210 via path 254). In response to receiving this trigger, the power management unit may temporarily assert signal AP_EN on path 252 to wake up the applications processor and to assert Auth/ (e.g., to drive Auth/ low). Signal Auth/ may only be asserted when the desired payment activating user input has been detected by the PMU. While the applications processor is awake, the power management unit may then send a read button press event command to the applications processor via the I²C bus 250.

At time t2, the applications processor may send a corresponding command via path 250 to the power management unit that directs the power management unit to turn on the secure element. This command may direct the power management unit to assert the power signal PWR and the enable signal SE_EN to provide power and to wake the secure element from sleep mode.

Some time after the secure element has awakened (at time t3), the secure element may determine whether the detected user input is the predetermined valid payment activating user input by checking the value of Auth/. If Auth/ is asserted, then the secure element confirms a valid trigger event, asserts the button pressed flag, and sends a corresponding button press activation notification to the applications processor (see, step 418 of FIG. 6). Prior to actually receiving the button press activation notification from the secure element, the power management unit may assert Auth/ and AP_EN to alert the applications processor (at time t4). By only selectively asserting control signal Auth/, the power management unit controls when the secure element is permitted to set the button pressed flag and when the secure element is permitted to send the button press activation status word to the applications processor (e.g., the secure element may be configured to keep the button pressed flag deasserted if Auth/ is not asserted at time t3.

Figure 8:
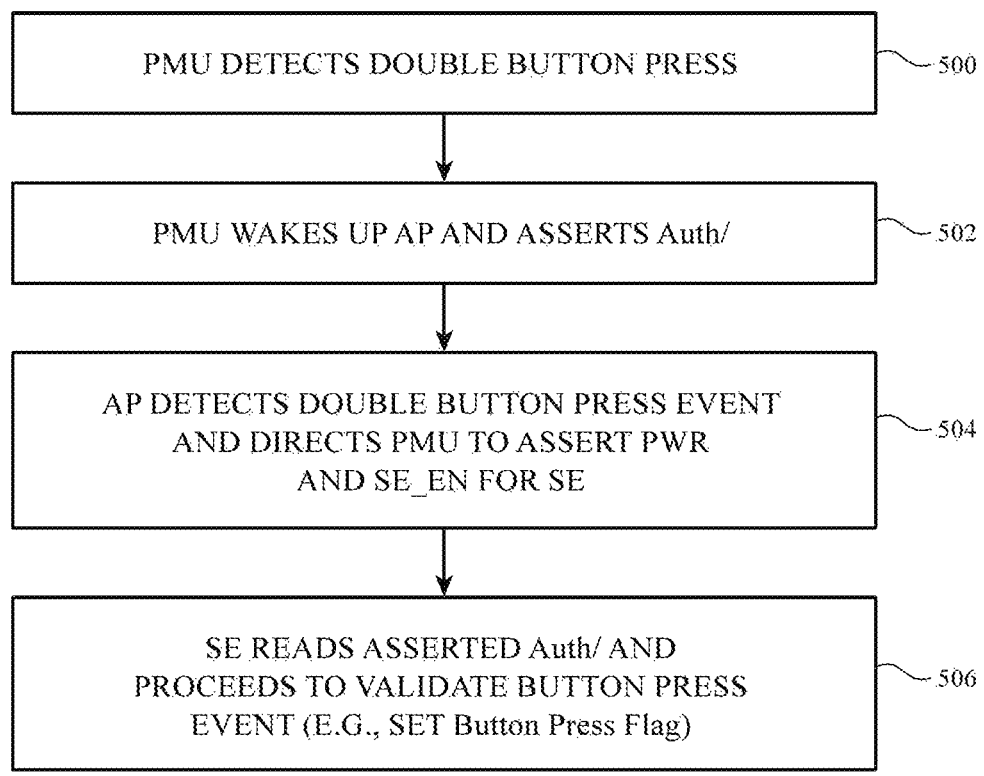
FIG. 8 is a flow chart of illustrative steps for using a power management unit to detect a valid user input for initiating mobile payment in accordance with an embodiment.

FIG. 8 is a flow chart that briefly summarizes the sequence of events described in connection with FIG. 7. At step 500, the power management unit may detect a double button press event (or other user payment activation input). At step 502, the power management unit may wake up the applications processor and assert Auth/ for a predetermined period of time.

At step 504, the application processor may realize that the power management unit has detected a double button press event from the user and may direct the power management unit to turn on the secure element. After the secure element has been turned on and if the secure element receives an asserted Auth/, the secure element may proceed to validate the button press event by setting the button pressed flag and by sending a button press activation status word to the applications processor, which in turn directs the applications processor to perform steps 419 (FIG. 6).

The operations described in FIGS. 5-8 for ensuring that the authorized user is in fact in possession of the electronic device and for detecting a valid user input that triggers a temporary activation of a selected payment applet are merely illustrative and do not serve to limit the scope of the present invention. In general, the approaches described herein can be extended to any device having a secure element and can be used to detect any other type of user input.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method of operating an electronic device, comprising:
   configuring the electronic device in a passcode-locked state;
   receiving a passcode input to unlock the electronic device;
   in response to receiving the passcode input to unlock the electronic device, retrieving a random authorization number;
   receiving a payment activation input;
   in response to receiving the payment activation input, temporarily activating the electronic device at least partially using the random authorization number to utilize an item of stored payment information for performing a mobile payment transaction; and
   performing, using the item of stored payment information, a mobile payment transaction while the electronic device is within a communication range of a merchant terminal.

2. The method of claim 1, wherein the payment activation input comprises a swiping motion on a display of the electronic device.

3. The method of claim 1, wherein the payment activation input comprises a button press.

4. The method of claim 1, wherein the payment activation input comprises receiving, at a single button, a double button press.

5. The method of claim 1, further comprising:
   performing fingerprint authentication prior to temporarily activating the electronic device for use in conducting the mobile payment transaction.

6. The method of claim 1, further comprising:
   terminating the mobile payment transaction when the mobile payment transaction has not been completed within a predetermined time period following receiving the payment activation input.

7. The method of claim 1, wherein the electronic device includes an applications processor and a secure element, wherein temporarily activating the electronic device comprises sending a host challenge from the applications processor to the secure element, and wherein the host challenge includes a first additional random authorization number that is different than the random authorization number.

8. The method of claim 7, wherein temporarily activating the electronic device further comprises sending a secure element challenge from the secure element to the applications processor, and wherein the secure element challenge includes a second additional random authorization number.

9. The method of claim 8, wherein temporarily activating the electronic device further comprises comparing the second additional random authorization number to the random authorization number.

10. The method of claim 9, wherein temporarily activating the electronic device further comprises sending a host cryptogram from the applications processor to the secure element, and wherein the host cryptogram comprises the host challenge, the secure element challenge, and the random authorization number.

11. A method of operating an electronic device that includes a host processor and a secure element, the method comprising:
    detecting a payment activation trigger event comprising input from a user;
    in response to detecting the payment activation trigger event, authenticating a payment applet on the electronic device for use in a mobile payment transaction; and
    conducting, using the authenticated payment applet, a secure mobile payment transaction while the electronic device is within a communication range of a merchant terminal, wherein using the authenticated payment applet to complete the secure mobile payment transaction comprises using the host processor to send authentication information to the secure element.

12. The method of claim 11, wherein detecting the payment activation trigger event comprises detecting a swiping input on a touch screen associated with the electronic device.

13. The method of claim 11, wherein detecting the payment activation trigger event comprises detecting a manual button press event.

14. The method of claim 11, wherein detecting the payment activation trigger event comprises detecting a successful fingerprint authentication event.

15. The method of claim 11, wherein using the authenticated payment applet to conduct the secure mobile payment transaction further comprises using the authenticated payment applet to complete the secure mobile payment transaction while the electronic device is located within 10 centimeters of the merchant terminal.

16. The method of claim 11, further comprising:
    automatically deactivating the payment applet within a predetermined time period following the payment activation trigger event.

17. The method of claim 11, further comprising:
    configuring the electronic device in a passcode-locked state prior to receiving the payment activation trigger event.

18. The method of claim 11, wherein detecting the payment activation trigger event comprises receiving, at a single button, a double button press.

19. An electronic device, comprising:
- a plurality of input-output devices configured to receive a payment activation input from a user, wherein at least one of the plurality of input-output devices comprises a single button configured to detect a double button press;
- a secure element storing a payment applet for use in conducting a secure mobile payment transaction; and
- an applications processor that, responsive to receiving a payment activation input at one of the plurality of input-output devices, communicates with the secure element to temporarily activate the payment applet for use in a wireless mobile payment transaction with a merchant terminal.

20. The electronic device of claim 19, wherein at least one of the plurality of input-output devices comprises a touchscreen configured to detect a touch event comprising a swiping motion.

21. The electronic device of claim 19, wherein at least one of the plurality of input-output devices comprises a biometric sensor configured to receive a fingerprint input.

22. The electronic device of claim 19, further comprising:
- a power management unit that is separate from the secure element and the applications processor and that wakes up the applications processor in response to the received payment activation input.

23. The electronic device of claim 19, further comprising:
- a wireless communication interface that detects when the electronic device is brought within an operational range of the merchant terminal, wherein the wireless mobile payment transaction can be completed only when the electronic device is located within the operational range of the merchant terminal.

24. The electronic device of claim 19, wherein the electronic device is in a passcode-locked state prior to receiving the payment activation input.

25. The electronic device of claim 19, wherein the applications processor sends a host challenge to the secure element, and the secure element responds by sending a secure element challenge to the applications processor.

* * * * *